No. 699,180. Patented May 6, 1902.
J. JETTER.
UNIVERSAL JOINT.
(Application filed July 15, 1901.)
(No Model.)

Witnesses:
John F.C. Prinkerh
Fred O. Fish

Inventor:
Julius Jetter
by his attorney
Benjamin Phillips

UNITED STATES PATENT OFFICE.

JULIUS JETTER, OF WINCHESTER, MASSACHUSETTS.

UNIVERSAL JOINT.

SPECIFICATION forming part of Letters Patent No. 699,180, dated May 6, 1902.

Application filed July 15, 1901. Serial No. 68,433. (No model.)

*To all whom it may concern:*

Be it known that I, JULIUS JETTER, a citizen of the United States, residing at Winchester, in the county of Middlesex and State of Massachusetts, have invented certain new and useful Improvements in Universal Joints; and I do hereby declare the following to be a full, clear, and exact description of the invention, such as will enable others skilled in the art to which it appertains to make and use the same.

The present invention relates to universal joints of the type comprising suitable coupling-heads and an interposed connecting-block pivotally secured to the coupling-heads.

The object of my invention is to provide a universal joint of the type referred to of improved construction, particularly as to the means for pivotally securing the connecting-block to the coupling-heads.

With this object in view my invention consists in the universal joint hereinafter described and claimed, the advantages of which will be apparent to those skilled in the art from the following description.

My invention will be clearly understood from the accompanying drawings, in which is illustrated a universal joint embodying my invention in its preferred form.

Figure 1:
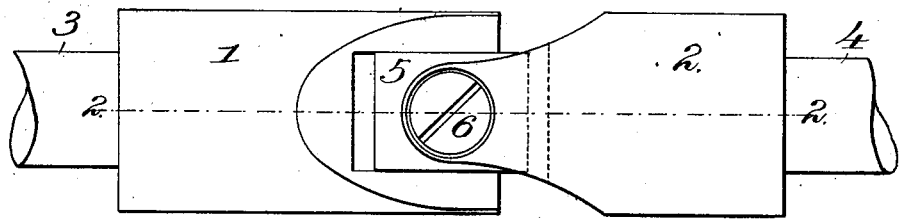
Figure 2:
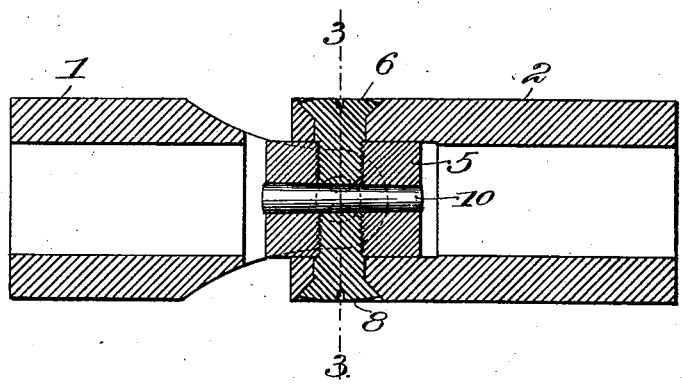
Figure 3:
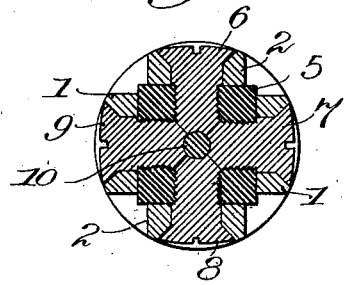

In said drawings, Figure 1 is a view in side elevation of the universal joint and the ends of the shafts connected thereby. Fig. 2 is a view in longitudinal section on the line 2 2 of Fig. 1, the shafts being omitted; and Fig. 3 is a view in cross-section on the line 3 3 of Fig. 2.

1 and 2 represent the coupling-heads of any suitable construction, secured to or formed integral with the shafts 3 and 4. Between the forked ends of the coupling-heads is interposed the connecting-block 5, which is pivotally secured to the coupling-heads. For pivotally securing the connecting-block to the coupling-heads my invention contemplates the use of screws passing through the forked ends of the coupling-heads and screwing into the block, and in order to prevent these screws from working loose my invention contemplates the use of a pin arranged to engage the screws, so as to prevent rotation thereof. These screws are indicated in the drawings at 6, 7, 8, and 9, and, as shown, are provided with conical ends, which contact at the center of the block. The pin for preventing rotation of the screws is indicated at 10 and extends through a hole in block 5 at right angles to the plane in which the screws 6, 7, 8, and 9 are located and engages grooves formed in the ends of the screws. To allow the pin 10 to be readily inserted, it preferably has a driving fit in the hole in the block 5, but may be screw-threaded or secured therein in any other suitable manner, if desired. The block 5 is preferably rectangular in cross-section and has a sufficient extent of surface in contact with the inner surfaces of the forks of the coupling-heads to relieve the pivot-screws of substantially all strain.

The joint above described is of simple and inexpensive construction and is reliable and efficient in operation. While the various parts may be finished before being assembled, a convenient method of manufacture is to secure the connecting-block to the coupling-heads by means of the screws and thereafter form the hole in the block to receive the pin 10 and the grooves in the ends of the screws by means of a drill, or the grooves in the ends of the screws may be formed by a drill inserted through the hole previously formed in the block which receives the pin 10.

Having thus described my invention, I claim as new and desire to secure by Letters Patent of the United States—

1. A universal joint, having, in combination, coupling-heads, a block interposed between the coupling-heads, screws pivotally connecting the block with the heads, and a pin arranged to engage the screws and prevent rotation thereof, substantially as described.

2. A universal joint, having, in combination, coupling-heads, a block interposed between the coupling-heads, conical-ended screws pivotally connecting the block with the heads, and a pin arranged to engage the ends of the screws and prevent rotation thereof, substantially as described.

3. A universal joint, having, in combination, coupling-heads, a block interposed between the coupling-heads, four screws provided with grooved ends pivotally connecting the block with the heads, and a pin arranged to engage the grooves in the ends of the screws and prevent rotation thereof, substantially as described.

4. A universal joint, having, in combination, forked coupling-heads, a block interposed between the coupling-heads provided with surfaces engaging the inner surfaces of the forks of the coupling-heads, four screws provided with grooved ends pivotally connecting the block with the heads and a pin having a driving fit in a hole in the block at right angles to the plane in which the screws are located arranged to engage the grooves in the ends of the screws and prevent rotation thereof, substantially as described.

In testimony whereof I affix my signature in presence of two witnesses.

JULIUS JETTER.

Witnesses:
ELLA F. BUTMAN,
ROSALIE JETTER.